(12) United States Patent  
Kim

(10) Patent No.: US 11,838,586 B2
(45) Date of Patent: Dec. 5, 2023

(54) DISPLAY DEVICE

(71) Applicant: LG ELECTRONICS INC., Seoul (KR)

(72) Inventor: Hyunseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/762,911

(22) PCT Filed: Sep. 27, 2019

(86) PCT No.: PCT/KR2019/012646
§ 371 (c)(1),
(2) Date: Mar. 23, 2022

(87) PCT Pub. No.: WO2021/060589
PCT Pub. Date: Apr. 1, 2021

(65) Prior Publication Data
US 2022/0377417 A1 Nov. 24, 2022

(51) Int. Cl.
*H04N 21/45* (2011.01)
*H04N 21/431* (2011.01)
*H04N 21/472* (2011.01)

(52) U.S. Cl.
CPC ..... *H04N 21/4532* (2013.01); *H04N 21/4316* (2013.01); *H04N 21/47214* (2013.01)

(58) Field of Classification Search
CPC .......... H04N 21/4532; H04N 21/4316; H04N 21/47214; H04N 21/4823; H04N 21/4882; H04N 21/84; H04N 21/4755
See application file for complete search history.

(56) References Cited

U.S. PATENT DOCUMENTS

| | | | | |
|---|---|---|---|---|
| 2008/0066111 | A1* | 3/2008 | Ellis | G06F 3/00 |
| 2008/0243926 | A1* | 10/2008 | Wako | G06F 7/00 |
| 2012/0180090 | A1 | 7/2012 | Yoon et al. | |
| 2014/0040942 | A1 | 2/2014 | Ellis et al. | |
| 2015/0382047 | A1 | 12/2015 | Van Os et al. | |
| 2016/0028667 | A1* | 1/2016 | Faaborg | H04L 51/046 |
| 2016/0105708 | A1 | 4/2016 | Packard et al. | |
| 2017/0085939 | A1 | 3/2017 | Gupta et al. | |
| 2018/0227639 | A1* | 8/2018 | Qi | H04N 21/4826 |
| 2020/0057533 | A1* | 2/2020 | Ueda | G06F 3/0481 |

FOREIGN PATENT DOCUMENTS

| | | |
|---|---|---|
| JP | 2018-501533 A | 1/2018 |
| JP | 2018-533288 A | 11/2018 |
| JP | 2019-24157 A | 2/2019 |
| KR | 10-2012-0080985 A | 7/2012 |
| KR | 10-2018-0133354 A | 12/2018 |

* cited by examiner

*Primary Examiner* — Anthony Bantamoi
(74) *Attorney, Agent, or Firm* — Birch, Stewart, Kolasch & Birch, LLP

(57) ABSTRACT

The present disclosure relates to a display device that preferentially provides information preferred by a user and includes a display unit and a control unit configured to set a preferred item for a specific category, wherein the control unit preferentially displays the preferred item when displaying information related to the specific category by receiving a display command for the information related to the specific category.

18 Claims, 17 Drawing Sheets

DISPLAY DEVICE

CROSS REFERENCE TO RELATED APPLICATIONS

This application is the National Phase of PCT/KR2019/012646 filed on Sep. 27, 2019, which is hereby expressly incorporated by reference into the present application.

TECHNICAL FIELD

The present disclosure relates to a display device, and more particularly to a display device that is capable of preferentially providing information preferred by a user.

BACKGROUND ART

In recent years, digital TV services using wired or wireless communication network are becoming popular. Digital TV services are capable of providing various services that could not be provided by the existing analog broadcasting services.

For example, Internet Protocol Television (IPTV) and smart TV services, which are types of digital TV services, provide interactivity so that users may actively select the types of watching programs, the watching time, and the like. The IPTV and smart TV services may provide various additional services, such as Internet search, home shopping, and online games, based on such interactivity.

As described above, the user may more easily search for and receive various information through the TV. When a user searches for specific information through the TV, it may be inconvenient to find preferred information from the search results one by one. For example, when the user searches for a game of a favorite sports team, the user may be inconvenient to first search for sports and then find a game of the favorite sports team from among the search results.

DISCLOSURE OF THE INVENTION

Technical Problem

The display device according to the present disclosure intends to preferentially provide information on a user's preferred item when providing information on a specific category.

The display device according to the present disclosure intends to preferentially provide information on a sports team preferred by a user or a sports player preferred by the user when providing information on sports.

Technical Solution

A display device according to an embodiment of the present disclosure includes a display unit and a control unit configured to set a preferred item for a specific category, wherein the control unit preferentially displays the preferred item when displaying information related to the specific category by receiving a display command for the information related to the specific category.

The specific category may include at least one of sports, drama, movie, entertainment program, or documentary program, and the preferred item may include at least one of a sports team, a person, or a genre.

The control unit of the display device according to an embodiment of the present disclosure may receive a setting command for a preferred team for a sports category.

When receiving a display command for information related to the sports category, the control unit of the display device according to an embodiment of the present disclosure may control the display unit to display information related to the preferred team in front of information related to a team that is not set as the preferred team.

When receiving a display command for information related to the sports category, the control unit of the display device according to an embodiment of the present disclosure may control the display unit to display information related to the preferred team, which is larger than information related to a team that is not set as the preferred team.

When receiving the display command for information related to the sports category, the control unit of the display device according to an embodiment of the present disclosure may control the display unit to display the information related to the preferred team, which is distinguished from the information related to the team that is not set as the preferred team.

When receiving the display command for information related to the sports category in a state in which the preferred team is not set, the control unit of the display device according to an embodiment of the present disclosure may control the display unit to display the information related to the sports category in an order of channel numbers.

When a broadcast related to the preferred team is scheduled, the control unit of the display device according to an embodiment of the present disclosure may control the display unit to display an alarm before starting the broadcast related to the preferred team.

The display unit of the display device according to an embodiment of the present disclosure may overlappingly display the alarm on a current image.

When a change of the information related to the preferred team occurs, the control unit of the display device according to an embodiment of the present disclosure may control the display unit to display changed information related to the preferred team.

When a game score of the preferred team is changed, or a game of the preferred team is ended, the control unit of the display device according to an embodiment of the present disclosure may recognize this case as a case in which a change of the information related to the preferred team occurs.

The control unit of the display device according to an embodiment of the present disclosure may receive a setting command for the preferred team for each sport item.

When receiving the setting command for the preferred team for one sports item a plurality of times, the control unit of the display device according to an embodiment of the present disclosure may set all of a plurality of teams as the preferred team.

When the receiving a channel change command related to the sports category, the control unit of the display device according to an embodiment of the present disclosure may change the channel into a channel related to the preferred team among channels related to the sports category.

The control unit of the display device according to an embodiment of the present disclosure may individually set a type of received alarm related to the preferred team for each preferred team.

Advantageous Effects

According to the embodiment of the present disclosure, since the information on the user's preferred item is preferentially displayed, there may be the advantage that the information desired by the user is provided more quickly and accurately.

In addition, since the display device provides the information on the user's preferred item, the case of providing the information that the user does not want may be minimized, and thus the product reliability may be improved.

In addition, since the display device automatically displays the update information related to the user's preferred item, there may be the advantage in that the inconvenience of the user having to search for the information on the preferred item may be minimized.

MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
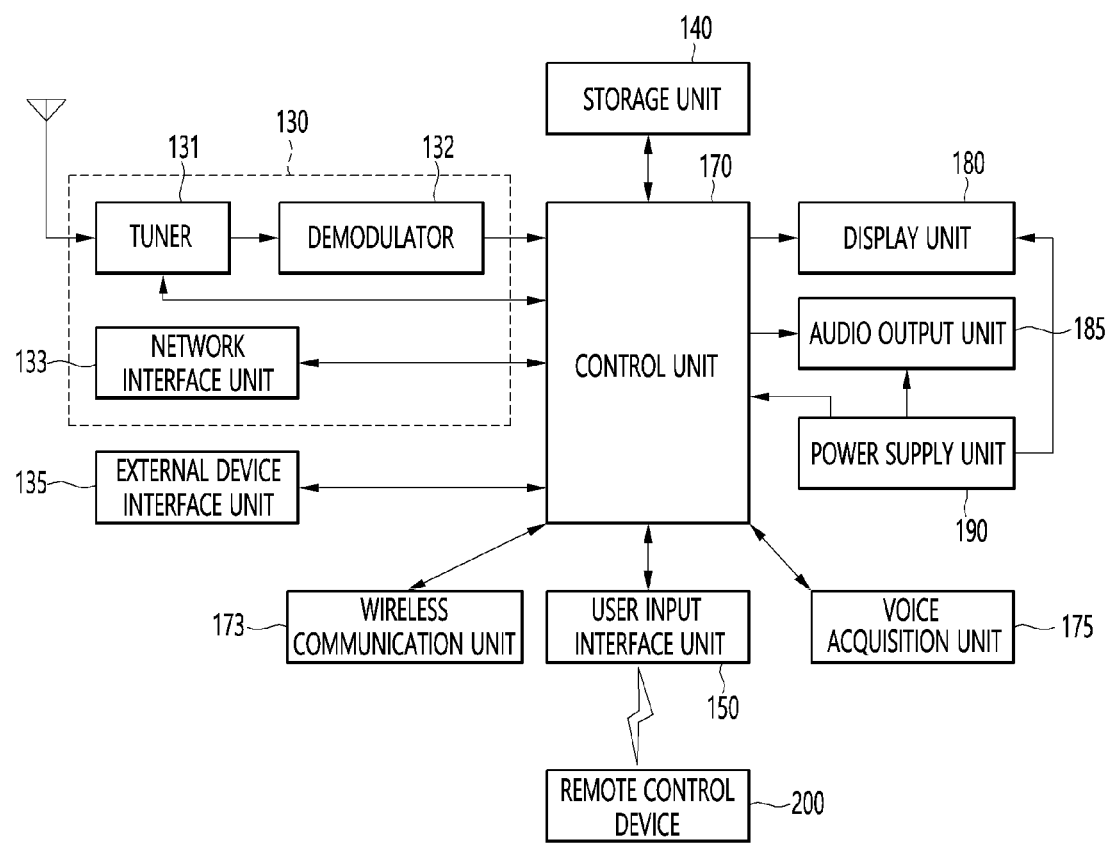
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
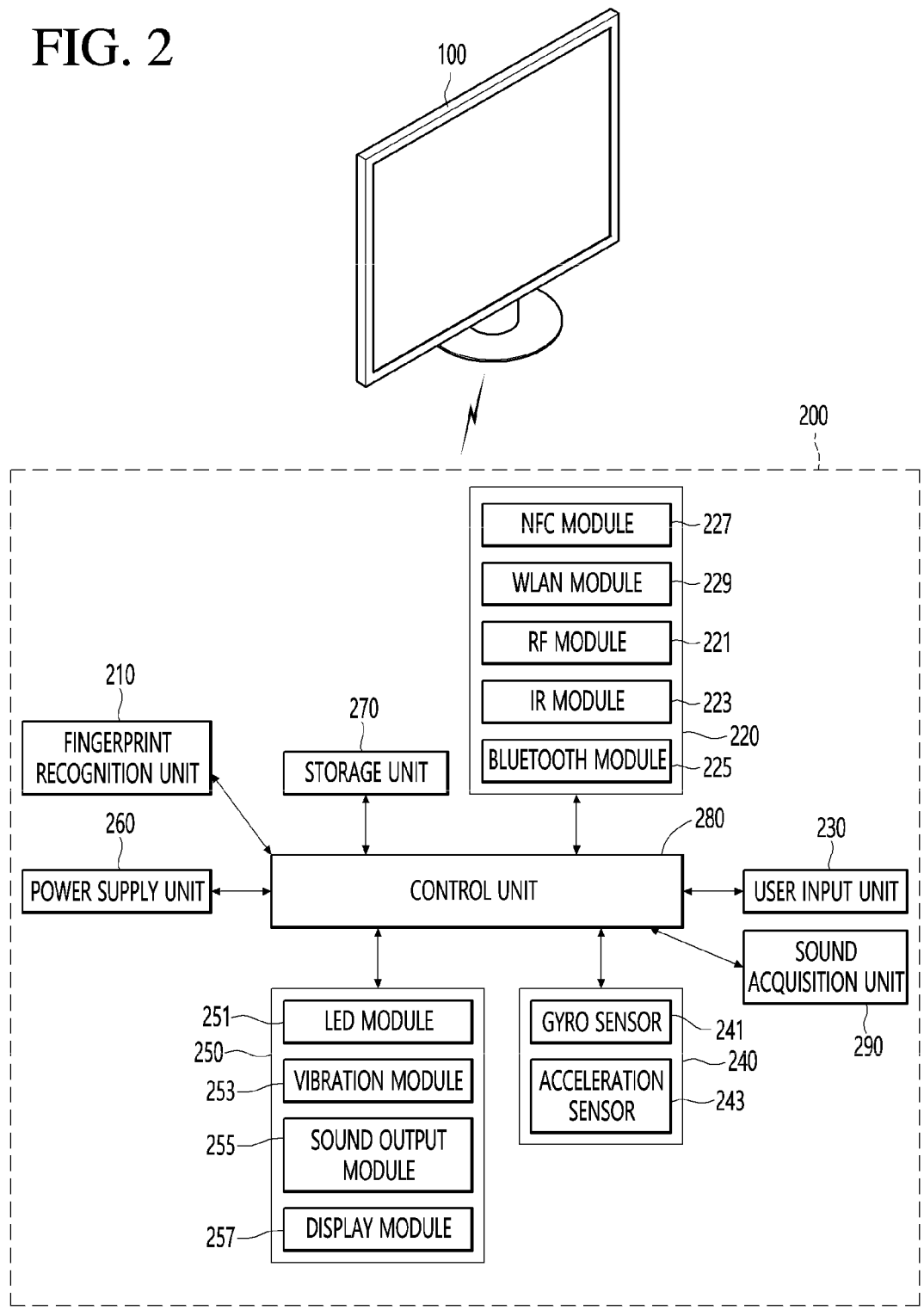
FIG. 2 is a block diagram illustrating a remote control device according to an embodiment of the present disclosure.
Figure 3:
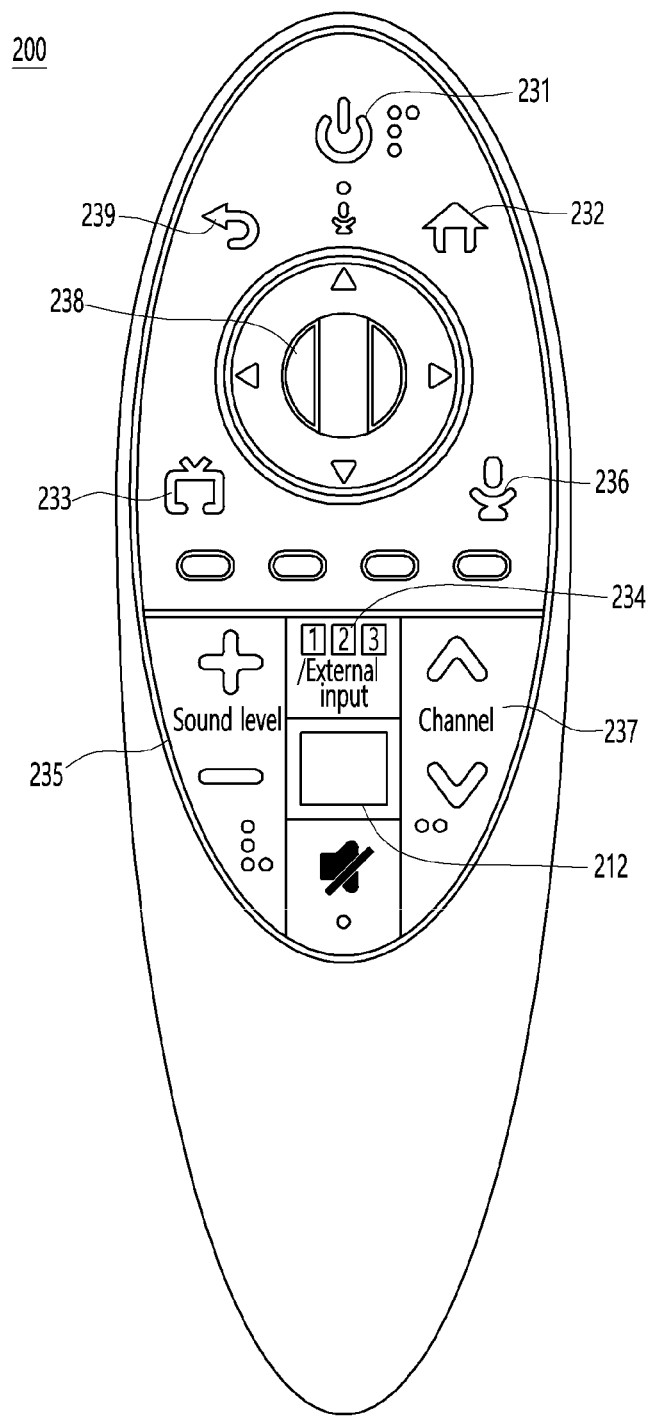
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
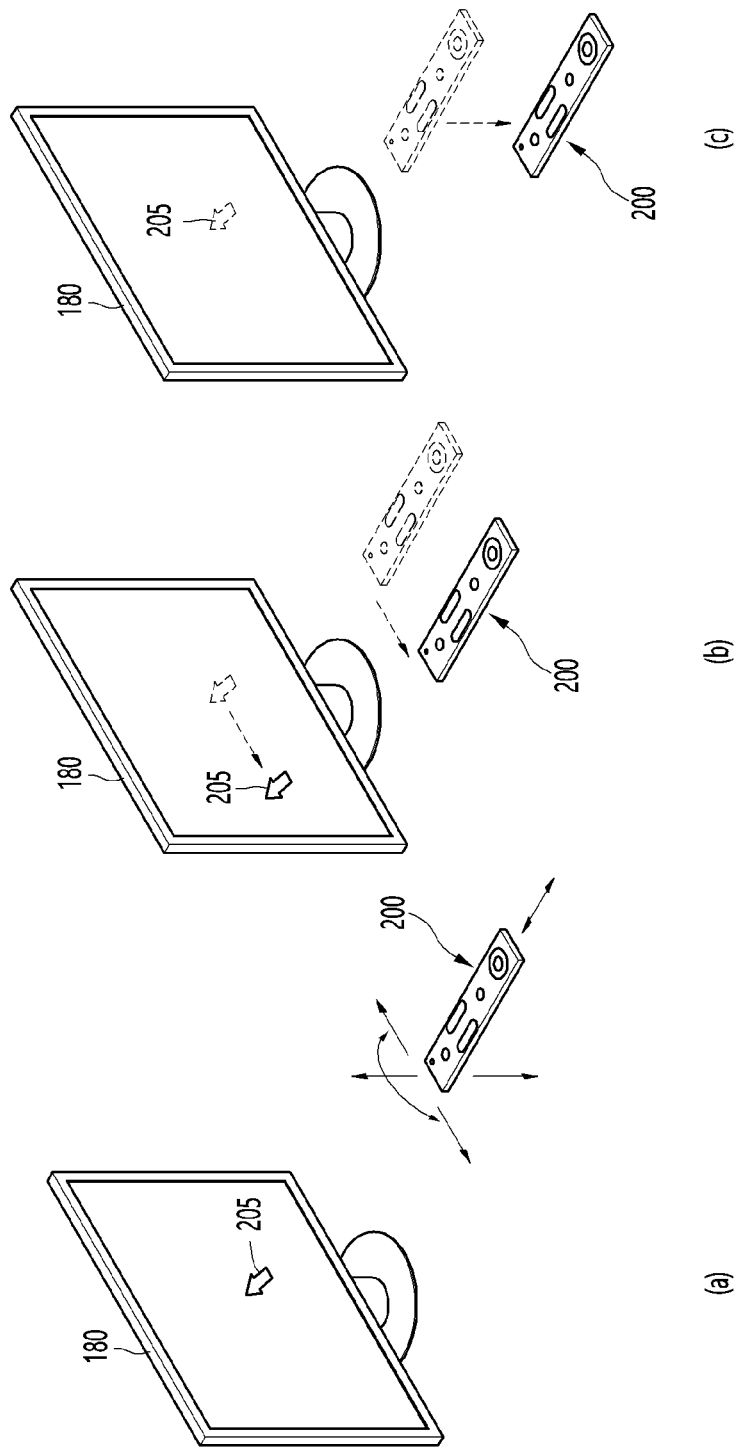
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
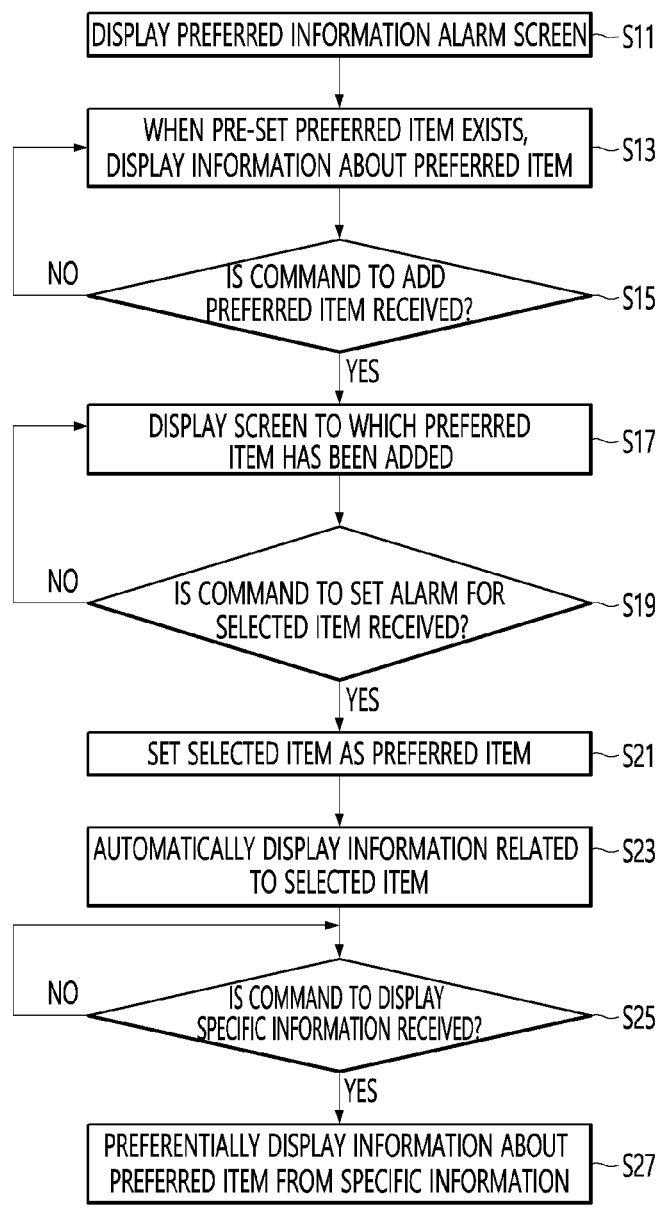
FIG. 5 is a flowchart illustrating a method for operating a display device according to an embodiment of the present disclosure.

FIG. 5 is a flowchart illustrating a method for operating a display device according to an embodiment of the present disclosure.

The control unit 170 may display a preferred information alarm screen (S11).

The preferred information alarm screen may be a screen for setting information preferred by the user. Specifically, the preferred information alarm screen may be a screen for receiving a selection of the user's preferred item and selection of what type of information the user is to receive as an alarm in relation to the preferred item.

If a preset preferred item exists, the control unit 170 may control the display unit 180 to display the information on the preferred item (S13).

When displaying the preferred information alarm screen, the control unit 170 may acquire whether the preset preferred item exists.

The preset preferred item may mean an item that is preset by the user.

When the preset preferred item exists, the control unit 170 may control the display unit 180 to display the information related to the preset preferred item on the preferred information alarm screen. On the other hand, if the preset preferred item does not exist, the control unit 170 may control the display unit 180 to display an icon that induces an addition of the preferred item on the preferred information alarm screen. Detailed descriptions thereof will be described in detail through an example illustrated in FIGS. 7 and 8.

The control unit 170 may determine whether an additional command for the preferred item is received (S15).

The control unit 170 may receive the additional command for the preferred item through the preferred information alarm screen. The preferred information alarm screen may include an icon 730 (see FIG. 7) that receives the additional command for the preferred item.

If the control unit 170 does not receive the additional command for the preferred item, the control unit 170 may continuously display the preferred information alarm screen that is being displayed.

When receiving the additional command for the preferred item, the control unit 170 may display an additional screen for the preferred item (S17).

The additional screen for the preferred item may be a screen for individually selecting the preferred item from the user. The additional screen for the preferred item may be different for each category. For example, the additional screen for the preferred item with respect to a sports category may be a screen on which a preferred team or preferred sports player is capable of being added, and the additional screen for the preferred item with respect to a drama category may be a screen on which a preferred genre or preferred actor is capable of being added.

The additional screen for the preferred item will be described in detail with reference to FIGS. 9 to 12.

The control unit 170 may receive selection of at least one item through the additional screen for the preferred item. The selected item may mean an item selected on the additional screen for the preferred item.

The control unit 170 may determine whether an alarm setting command for the selected item is received (S19).

The alarm setting command may be a command for setting the selected item as the preferred item. Also, the alarm setting command may include a command for setting a type of alarm to be guided to the user in relation to the selected item.

When receiving an alarm setting command for the selected item, the control unit 170 may set the selected item as the preferred item (S21).

The control unit 170 may set a preferred item for a specific category. The preferred item may mean an item preferred by the user, and the item may be various such as a team, a person, a genre, a league, and the like.

When the selected item is set as the preferred item, the control unit 170 may automatically display the information related to the selected item (S23).

According to a first embodiment, when update information related to the preferred item is generated, the control unit 170 may control the display unit 180 to automatically display the update information.

According to a second embodiment, when the type of alarm to be guided for each of the preferred items is preset, the control unit 170 may control the display unit 180 to detect an output time point of the set alarm and automatically display an alarm related to the selected item at each output time point of the alarm.

The above-described first embodiment and second embodiment are merely distinguished from each other for convenience of description. That is, the above-described first embodiment and the second embodiment may be implemented together.

The control unit 170 may determine whether a display command for specific information is received (S25).

The control unit 170 may receive the display command of the specific information through a button provided in the remote control device 200, a voice command through the voice acquisition unit 175, or the like.

When receiving a display command of specific information, the control unit 170 may preferentially display information on the preferred item among the specific information (S27).

When displaying the specific information according to the display command of the specific information, the control unit 170 may preferentially display the information on the preferred item if the information related to the preferred item exists. That is, the control unit 170 may control the display unit 180 to preferentially display the preferred item when displaying the information related to the specific category by receiving the display command for the information related to the specific category.

According to the first embodiment, the control unit 170 may preferentially display the information related to the preferred item by adjusting a display order. For example, the control unit 170 may control the display unit 180 to display the information related to the preferred item in front of information that is unrelated to the preferred item.

According to the second embodiment, the control unit 170 may preferentially display the information related to the preferred item by adjusting a display size. For example, the control unit 170 may control the display unit 180 to display the information related to the preferred item, which is larger than the information unrelated to the preferred item.

According to the third embodiment, the control unit 170 may preferentially display the information related to the preferred item by adjusting a display method. Specifically, the control unit 170 may control the display unit 180 to display the information related to the preferred item so as to be distinguished from the information that is unrelated to the preferred item. For example, the control unit 170 may control the display unit 180 to further display a highlight box (not shown) only on the information on the preferred item.

However, the above-described embodiments are merely examples for convenience of description. The control unit 170 may preferentially display the information related the preferred item over the information that is unrelated to the preferred item in various manners.

In addition, the above-described first embodiment, second embodiment, and third embodiment are merely distinguished from each other for convenience of description. That is, the above-described first embodiment, second embodiment, and third embodiment may be implemented in combination of two or more.

As described with reference to FIG. 5, the display device 100 may set the preferred item through the selection command for the preferred item, and in this case, the preferred item may be set for each category.

Specifically, the control unit 170 may set the preferred item for each specific category. In this case, the specific category may include at least one of sports, drama, movie, entertainment program, or documentary program, but this is not limited thereto because it is merely an example for convenience of description. In addition, the preferred item may include at least one of a sports team, a person, or a genre, but is not limited thereto as this is also provided as an example for convenience of description.

Next, as an example of an operation method of the display device 100 according to FIG. 5, a method, in which the control unit 170 sets a specific team as a preferred team for a sports category and automatically or preferentially displays information on the set preferred team. will be described.

Figure 6:
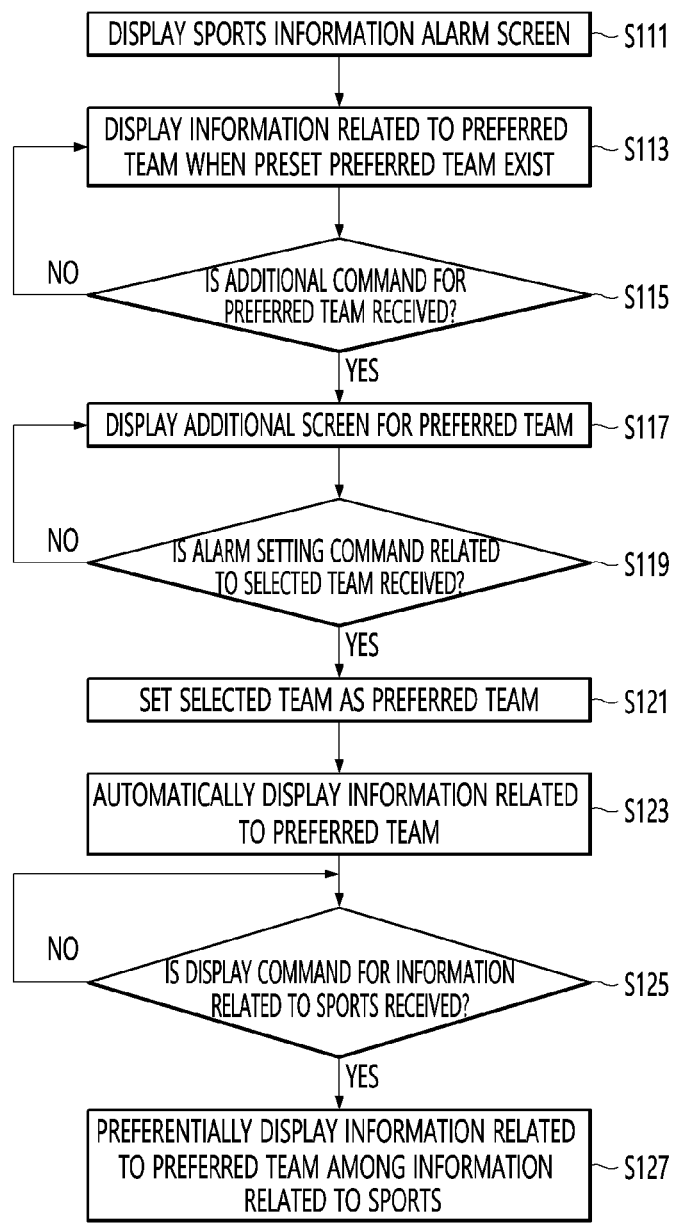
FIG. 6 is a flowchart illustrating an example of the method for operating the display device illustrated in FIG. 5.

FIG. 6 is a flowchart illustrating an example of the method for operating the display device illustrated in FIG. 5.

The control unit 170 may display a sports information alarm screen (S111).

The sports information alarm screen may be an example of a preferred information alarm screen.

If there is a preset preferred team, the control unit 170 may display information related to the preferred team (S113).

When displaying the sports information alarm screen, the control unit 170 may acquire whether the preset preferred team exists.

The preset preferred team may refer to a team preset in response to receiving a setting command from the user.

When the preset preferred team exists, the control unit 170 may control the display unit 180 to display the information related to the preset preferred team on the sports alarm screen. On the other hand, if the preset preferred team does not exist, the control unit 170 may control the display unit 180 to display an icon for inducing addition of the preferred team on the sports information alarm screen.

Figure 7:
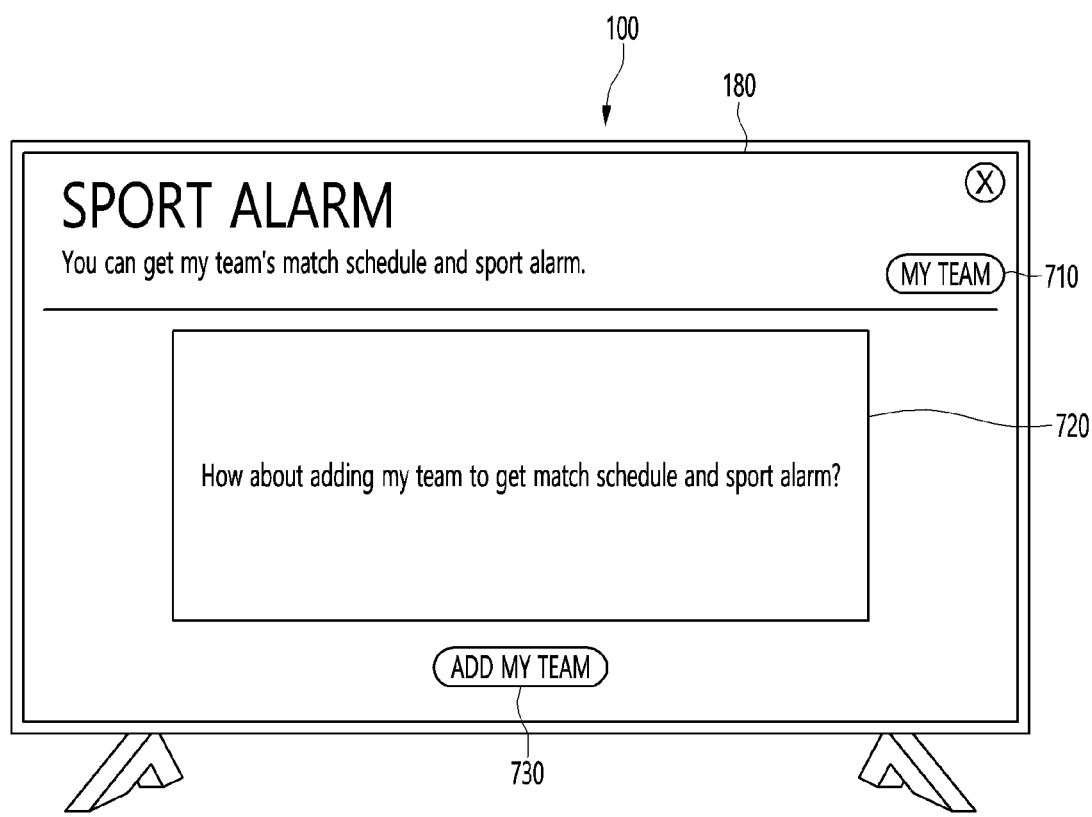
FIG. 7 is a view illustrating an example of a sports information alarm scree displayed by the display device according to an embodiment of the present disclosure.
Figure 8:
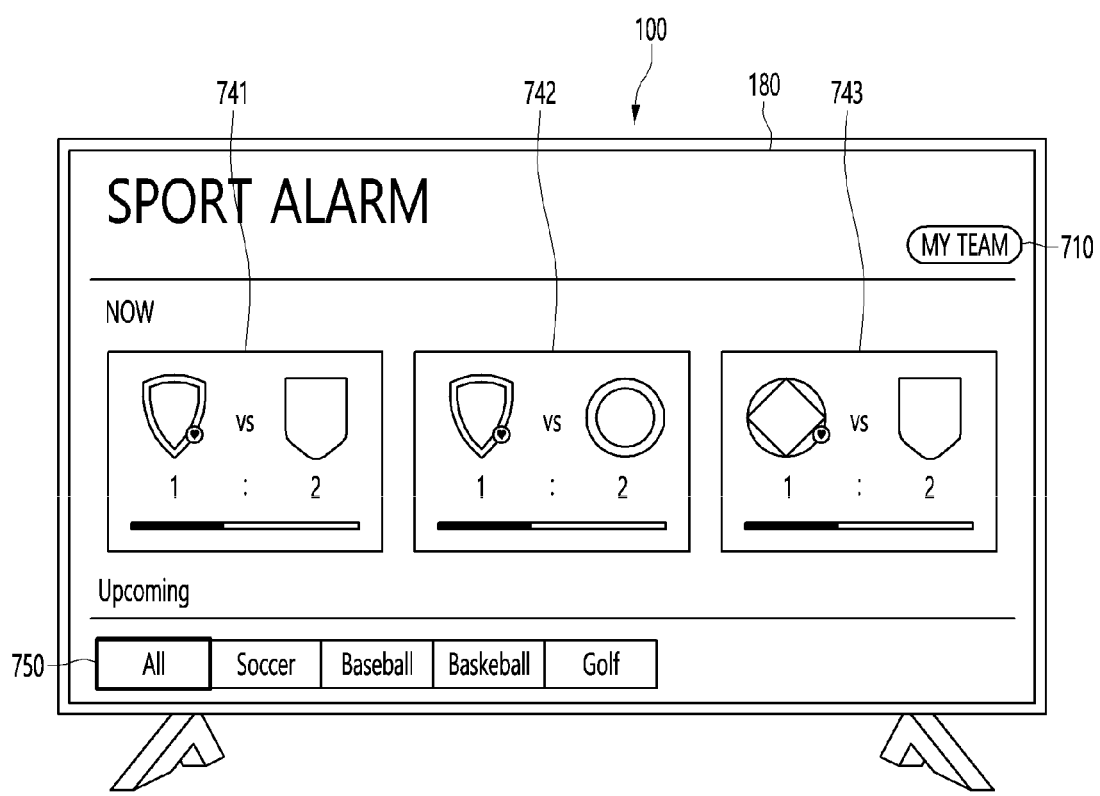
FIG. 8 is a view illustrating another example of the sports information alarm scree displayed by the display device according to an embodiment of the present disclosure.

FIG. 7 is a view illustrating an example of the sports information alarm scree displayed by the display device according to an embodiment of the present disclosure, and FIG. 8 is a view illustrating another example of the sports information alarm scree displayed by the display device according to an embodiment of the present disclosure.

Particularly, FIG. 7 is an example of the sports information alarm screen displayed by the display device 100 when the preset preferred team does not exist, and FIG. 8 is an example of the sports information alarm screen displayed by the display device 100 when the preset preferred team exists.

When displaying the sports information alarm screen, the control unit 170 may acquire whether the preset preferred team exists. If the preferred team is not set, the control unit 170 may display the sports information alarm screen as illustrated in FIG. 7.

As illustrated in FIG. 7, if the preferred team is not set, the sports information alarm screen may include at least one of a preferred team confirmation icon 710, function description information 720, or a preferred team addition icon 730.

The preferred team confirmation icon 710 may be an icon for converting the preset preferred team into a screen that is capable of being checked by the user. When receiving a selection command for the preferred team confirmation icon 710, the control unit 170 may control the display unit 180 to display a screen including the preset preferred team.

The function description information 720 may include a description of a function for setting the preferred team. The function description information 720 may include a description inducing the addition of the preferred team.

The preferred team addition icon 730 may be an icon for switching to a screen for receiving an additional command from the preferred team. When receiving a selection command for the preferred team addition icon 730, the control unit 170 may control the display unit 180 to display a screen for adding the preferred team.

As illustrated in FIG. 8, when at least one preferred team is set, the sports information alarm screen may include at least one of a preferred team confirmation icon 710, current information 741, 742, and 743 of the preferred team, and upcoming information 750 of the preferred teams.

Since the preferred team confirmation icon 710 is the same as described with reference to FIG. 7, duplicated descriptions will be omitted.

The current information 741, 742, and 743 of the preferred team may include current information related to the preset preferred team. For example, when three teams among the preset preferred teams are currently playing a game, the control unit 170 may control the display unit 180 to display game information 741, 742, and 743 for each of the three teams.

As described above, the display device 100 may directly inform the information, which is currently in progress related to the team set by the user as the preferred team through the current information 741, 742, and 743 of the preferred team, to the user without a user request.

The upcoming information 750 of the preferred team may include upcoming information related to the preset preferred team. For example, the upcoming information 750 of the preferred team may include information related to a game scheduled in relation to the preset preferred team.

As illustrated in FIG. 8, the control unit 170 may control the display unit 180 to display the upcoming information 750 of the preferred team for each game event.

Although not shown in FIG. 8, the sports information alarm screen displayed when at least one preferred team is set may further include a preferred team addition icon 730.

Again, FIG. 6 will be described.

The control unit 170 may receive a setting command for the preferred team for a sports category.

Specifically, the control unit 170 may determine whether an additional command from the preferred team is received (S115).

When receiving the selection command for the preferred team addition icon 730, the control unit 170 may determine that the preferred team additional command is received.

The preferred team addition icon 730 may be included in the sports information alarm screen. Also, the preferred team addition icon 730 may be included in the preferred team confirmation screen displayed when the preferred team confirmation icon 710 is selected. As described above, the preferred team addition icon 730 may be included in various screens.

When receiving the additional command for the preferred team, the control unit 170 may control the display unit 180 to display an additional screen for the preferred team (S117).

The additional screen for the preferred team may be a screen for receiving the user's selection for the preferred team.

The control unit 170 may receive a command for selecting one or more teams on the additional screen for the preferred team. The selected team may refer to a team selected through the additional screen for the preferred team.

The control unit 170 may determine whether an alarm setting command for the selected team is received (S119).

The alarm setting command for the selected team may be a command for setting the selected team as the preferred team.

In addition, the control unit 170 may further receive a command for specifying the type of information to be provided as an alarm to the user from the information related to the selected team as the alarm setting command.

That is, the user may set the alarm for setting the selected team as the preferred team, and the user may additionally set the type of information desired to be provided as the alarm.

When receiving the alarm setting command for the selected team, the control unit 170 may set the selected team as the preferred team (S121).

Next, referring to FIGS. 9 to 12, a method of setting the selected team as the preferred team when the display device 100 receives the team selection command on the additional screen for the preferred team according to an embodiment of the present disclosure will be described.

FIGS. 9 to 12 are exemplary views illustrating a method for setting the preferred team through the additional screen of the preferred team by the display device according to an embodiment of the present disclosure.

Figure 9:
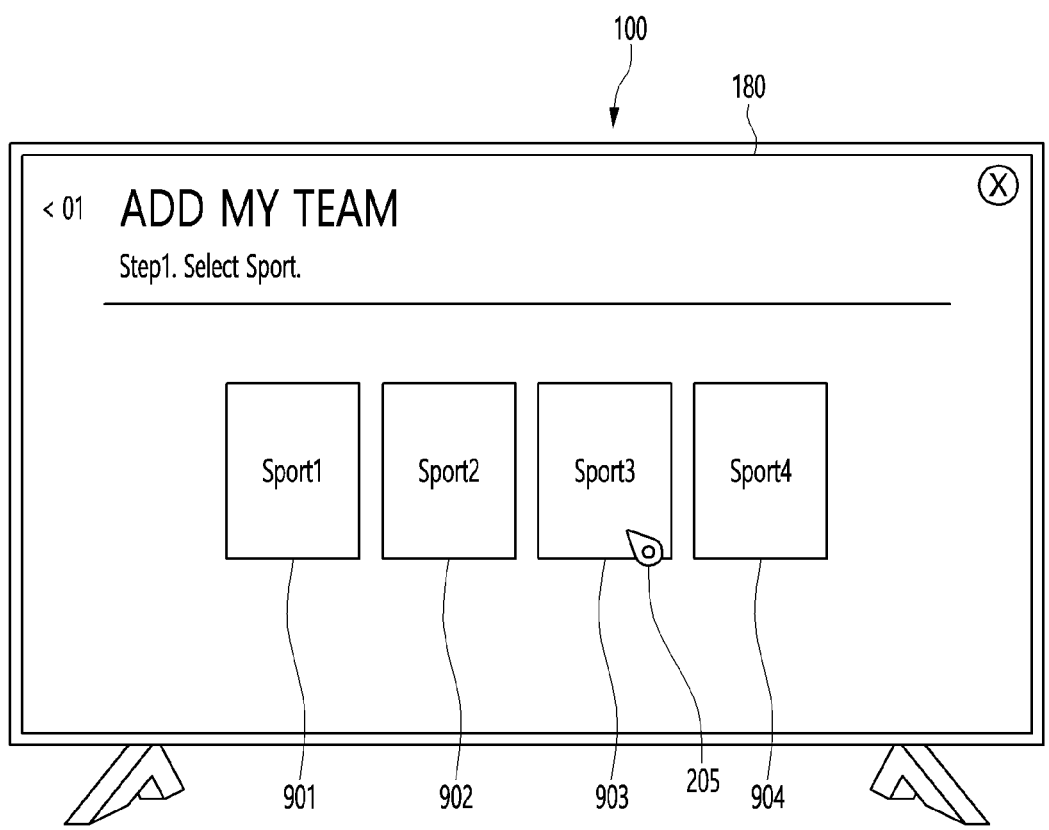
FIGS. 9 to 12 are exemplary views illustrating a method for setting a preferred team through an additional screen of the preferred team by the display device according to an embodiment of the present disclosure.

The control unit 170 may control the display unit 180 to display the additional screen for the preferred team when receiving the selection command for the preferred team addition icon 730. When displaying the additional screen for the preferred team, the control unit 170 may first display the sports item selection screen as illustrated in FIG. 9. The sports item selection screen as illustrated in FIG. 9 may be an initial screen of the additional screen for the preferred team.

The sports item selection screen may include at least one sports item icon. For example, as illustrated in FIG. 9, the sports item selection screen includes first to fourth sports item icons 901, 902, 903, and 904, and the first to fourth sports item icons 901, 902, 903, and 904 may represent different sports items, respectively. For example, the first sports item icon 901 may represent soccer, the second sports item icon 902 may represent baseball, the third sports item icon 903 may represent basketball, and the fourth sports item icon 904 may represent golf. However, since this is only an example, it is not limited thereto. In addition, although only four sports item icon is illustrated in FIG. 9, the number and type of sports item icon are merely exemplary.

As a result, the control unit 170 may receive the setting command for the preferred team for each sport item. When receiving a command for selecting any one sports item icon on the sports item selection screen, the control unit 170 may control the display unit 180 to display a league selection screen.

Figure 10:
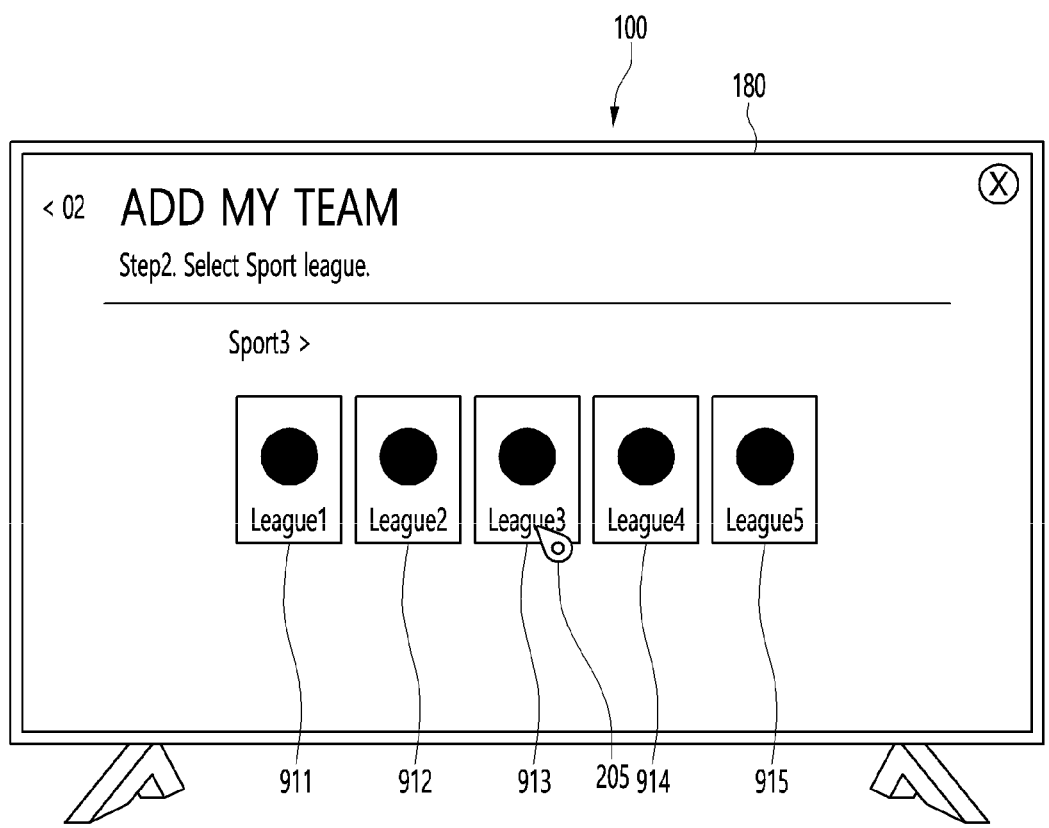

The league selection screen may indicate a league related to the sport selected on the sports item selection screen. For example, as illustrated in FIG. 10, the league selection screen may include first to fifth league icons 911, 912, 913, 914, and 915, and first to fifth league icons 911, 912, 913, 914, and 915 may represent different leagues, respectively. The number and types of league icons illustrated in FIG. 10 are merely exemplary and are not limited thereto.

When receiving a command for selecting any one league icon on the league selection screen, the controller 180 may control the display unit 180 to display the team selection screen.

Figure 11:
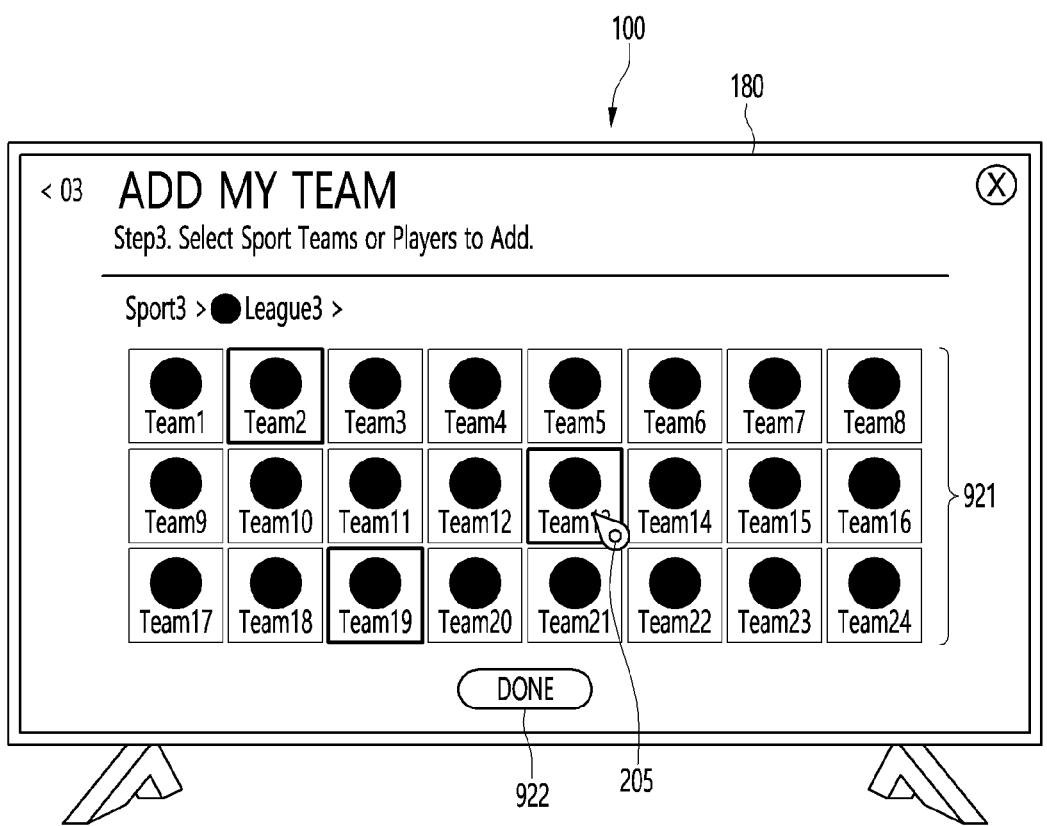

The team selection screen may indicate a sports team related to the league selected on the league selection screen. For example, as illustrated in FIG. 11, the team selection screen may include first to twenty-fourth sports team icons 921, and the first to twenty-fourth sports team icons 921 represent different sports teams, respectively. The number and types of sports team icons illustrated in FIG. 11 are merely exemplary and are not limited thereto.

The control unit 170 may receive a command for selecting one or more teams on the team selection screen through a pointer 205. The control unit 170 may control the display unit 180 to highlight the sports team icon corresponding to the sports team selected through the pointer 205. Referring to the example illustrated in FIG. 11, the second sports team, the thirteenth sports team, and the nineteen sports team may be the selected sports teams.

As illustrated in FIG. 11, the team selection screen may further include a completion icon 922. When receiving the selection command for the completion icon 922, the control unit 170 may recognize that an alarm setting command for setting the selected sports team as the preferred team is received. In the example of FIG. 11, when receiving the selection command for the completion icon 922, the control unit 170 may set the second sports team, the thirteenth sports team, and the nineteen sports team as the preferred teams.

When receiving the setting command for the preferred team for one sports item a plurality of times, the control unit 170 may set all of the plurality of teams as the preferred team.

Figure 12:
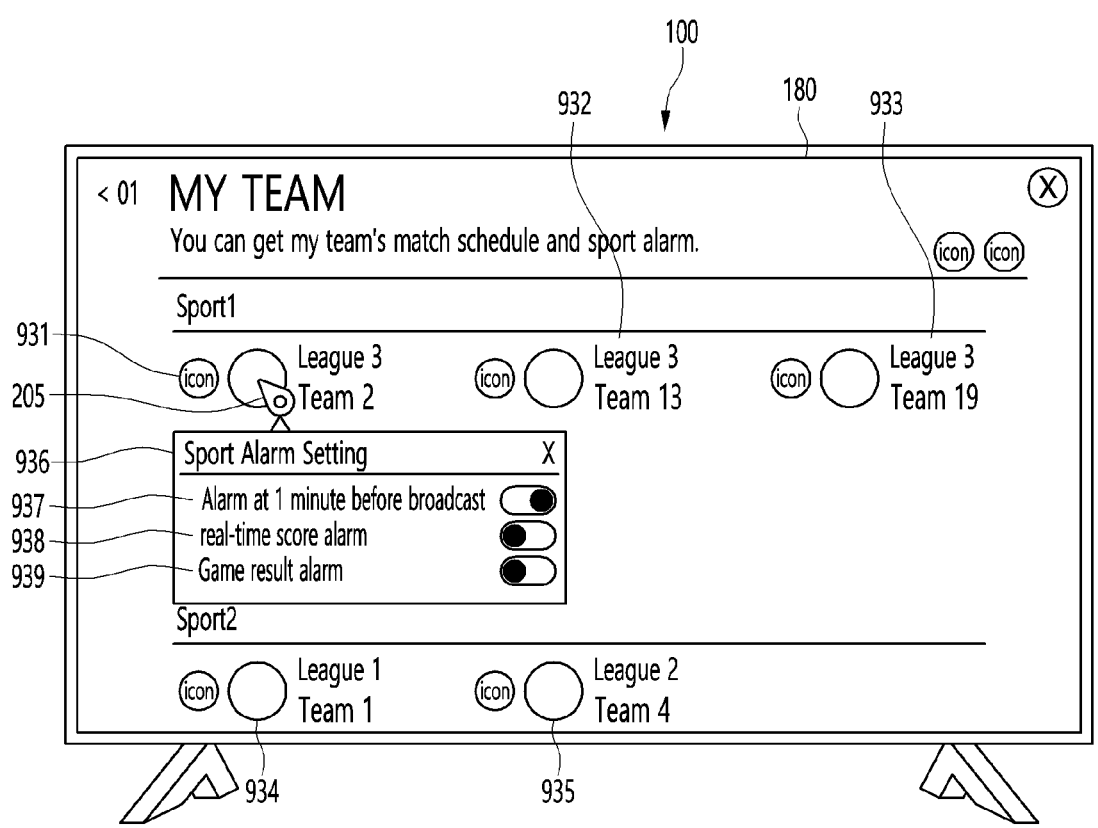

The control unit 170 may further receive a command for setting a type of reception alarm for each sports team set as the preferred team. As a specific example, the control unit 170 may display the preferred team screen as illustrated in FIG. 12 when receiving the selection command for the preferred team confirmation icon 710. The preferred team screen may include set preferred team icons 931, 932, 933, 934, and 935 indicating the preset preferred team.

The control unit 170 may display the set preferred team icons 931, 932, 933, 934, and 935 for each sport item.

When receiving a command to select any one of the setting preferred team icons 931, 932, 933, 934, and 935, the control unit 170 may control the display unit 180 to display an alarm type setting pop-up 936 for the selected preferred team.

The alarm type setting pop-up 936 may be a menu displayed to set the type of alarm to be output in relation to the preferred team. For example, the alarm type setting pop-up 936 may include at least one of a broadcast schedule alarm setting item 937, a real-time score alarm setting item 938, or a game result alarm setting item 939. The control unit 170 may turn on or off the broadcast schedule alarm setting item 937 whenever each of the real-time score alarm setting item 938 and the game result alarm setting item 939 is selected.

As described above, the control unit 170 may further set the type of alarm to be output through the alarm type setting pop-up 936 for each preferred team.

The control unit 170 may individually set the type of received alarm related to the preferred team for each preferred team.

Again, FIG. 6 will be described.

The control unit 170 may automatically display information related to the preferred team (S123).

The control unit 170 may control the display unit 180 to display an alarm corresponding to the type of alarm set in relation to the preferred team.

Next, a method of displaying the information related to the preferred team by the display device 100 according to an embodiment of the present disclosure will be described with reference to FIGS. 13 to 15.

Figure 13:
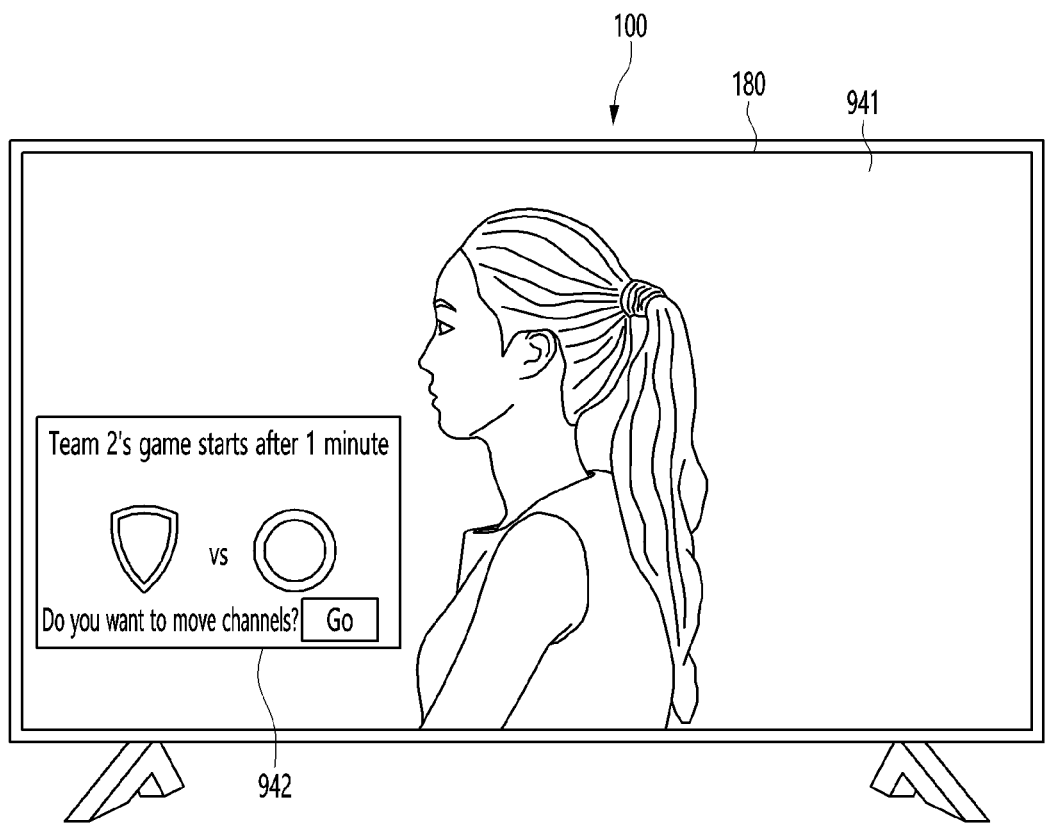
FIGS. 13 to 15 are exemplary views illustrating a method for display information related to the preferred team as an alarm by the display device according to an embodiment of the present disclosure.
Figure 14:
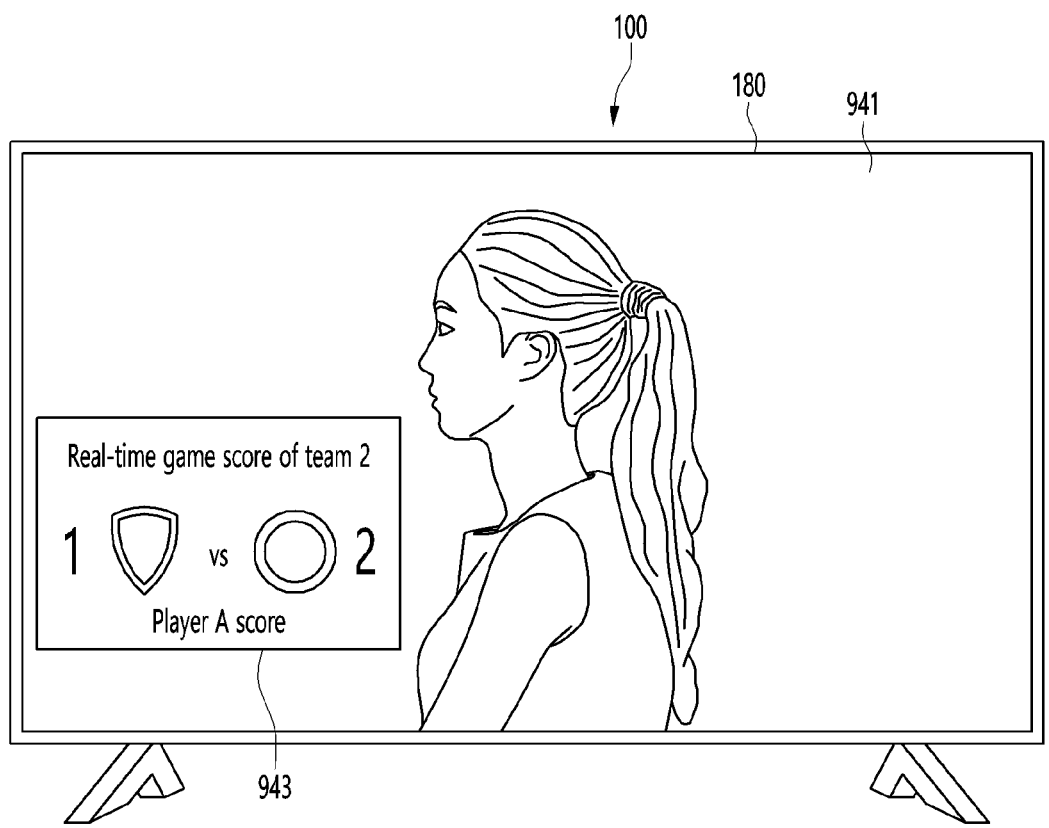
Figure 15:
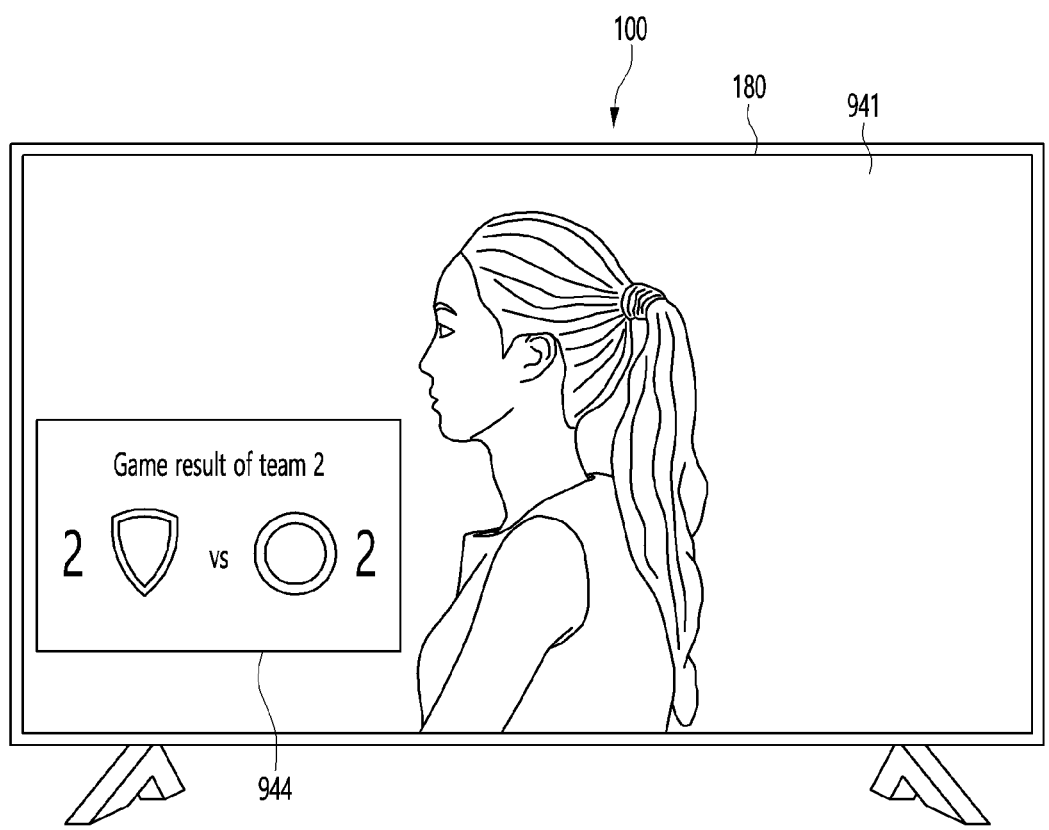

FIGS. 13 to 15 are exemplary views illustrating a method for display the information related to the preferred team as the alarm by the display device according to an embodiment of the present disclosure.

For example, if the broadcast scheduled alarm for the second preferred team is set as the reception alarm, the control unit 170 may control the display unit 180 to display a broadcast alarm 942 as illustrated in FIG. 13 before a scheduled broadcast time of a second preferred team. That is, when a broadcast related to the preferred team is scheduled, the control unit 170 may control the display unit 180 to display a broadcast alarm 942 before starting the broadcast related to the preferred team. The display unit 180 may overlappingly display the broadcast alarm 942 on an image 941 according to a current channel. The broadcast alarm 942 may include an icon that moves directly to the broadcast channel of the second preferred team.

As another example, if the real-time score alarm for the second preferred team is set as the reception alarm, the control unit 170 may control the display unit 180 to display the score alarm 943 as illustrated in FIG. 14.

The display unit 180 may overlappingly display a score alarm 943 on the image 941 according to the current channel. The score alarm 943 may include a current game score, information about a player who has scored, and the like.

According to an embodiment, the control unit 170 may control the display unit 180 to continuously display the score alarm 943 while the second preferred team is playing a game.

According to another embodiment, the control unit 170 may control the display unit 180 to display a score alarm 943 whenever a change occurs in the game score of the second preferred team.

As another example, if the game result alarm for the second preferred team is set as the reception alarm, the control unit 170 may control the display unit 180 to display the game result alarm 944 as illustrated in FIG. 15.

The display unit 180 may overlappingly display a game result alarm 944 on the image 941 according to the current channel. The game result alarm 944 may include final score information.

When the game of the second preferred team is finished, the control unit 170 may control the display unit 180 to display the game result alarm 944 of the second preferred team.

That is, when the information related to the preferred team is changed, the control unit 170 may control the display unit 180 to display the changed information related to the preferred team. Here, the changed information may include all of the broadcast schedule, the score change, the game end, and the like. That is, when the game score of the preferred team is changed or the game of the preferred team is ended, the control unit 170 may recognize that the information related to the preferred team is changed and control the display unit 180 to display an alarm related to the information change.

As described above, when at least one of a broadcast scheduled alarm, a real-time score alarm, or a game result alarm is set as a reception alarm, the control unit 170 may detect an output time point of the set reception alarm, and when the output time point of the alarm is detected, the control unit 170 may control the display unit 180 to overlappingly display the alarm on an image according to the current channel.

The types of alarms such as the broadcast schedule alarm, the real-time score alarm, and the game result alarm are merely exemplary. That is, the display device 100 may not be limited to the types of alarms described through the examples of FIGS. 13 to 15, but may set more various types of alarms and display various alarms for the preferred team according to the types of set alarms.

Again, FIG. 6 will be described.

The control unit 170 may determine whether a display command for the information related to sports is received (S125).

When receiving the display command for the information related to the sports, the control unit 170 may preferentially display information on a preferred team among the information related to the sports (S127).

For example, the control unit 170 may receive the display command for the information related to the sports, such as 'play soccer' or 'search for soccer'.

When receiving a display command for the information related to the sports, the control unit 170 may search for the information related to sports, which corresponds to the display command. The control unit 170 may preferentially display the information related to the preferred team among the searched information related to the sports.

Figure 16:
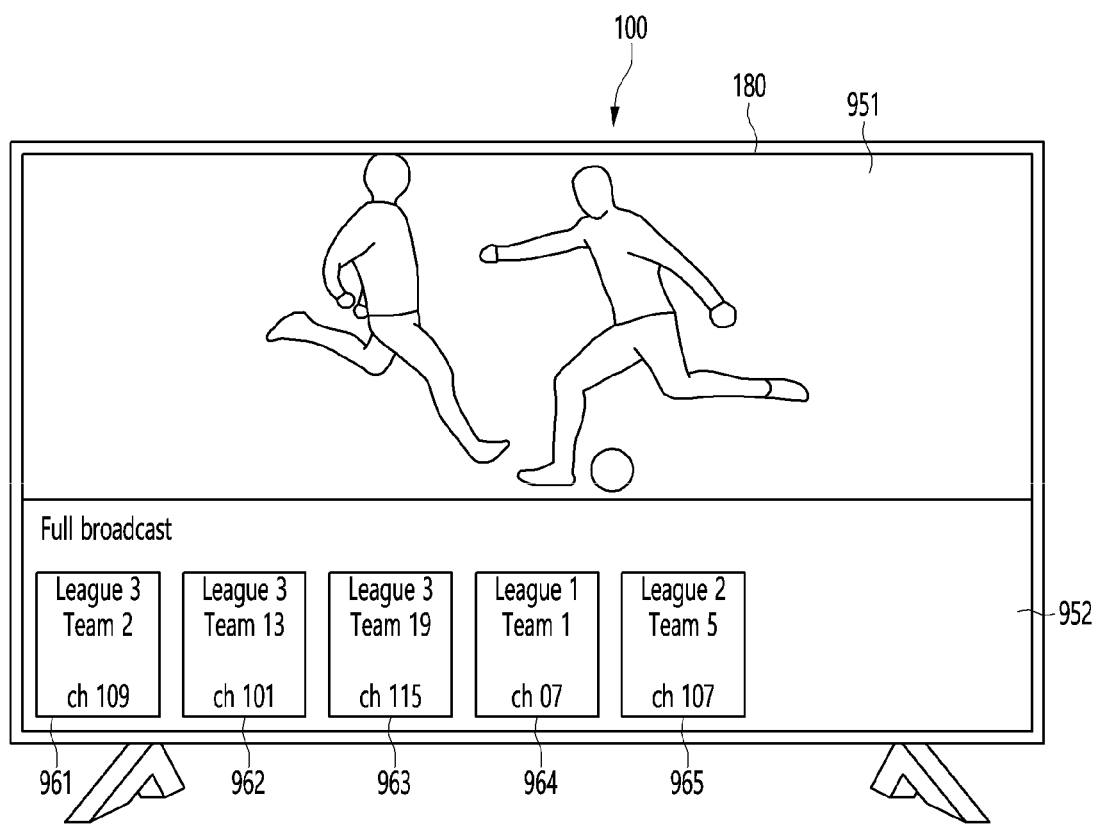
FIG. 16 is an exemplary view illustrating a method for preferentially display the information related to the preferred team by the display device according to an embodiment of the present disclosure.
Figure 16:

FIG. 16 is an exemplary view illustrating a method for preferentially display the information related to the preferred team by the display device according to an embodiment of the present disclosure.

When receiving a channel change command related to the sports category, the control unit 170 may change the channel into a channel related to the preferred team among channels related to the sports category.

For example, when receiving a display command for the information related to the sports such as 'play soccer', the control unit 170 may search for information on a soccer game currently being broadcast. The control unit 170 may acquire five pieces of game information as a result of searching for soccer game information. The control unit 170 may extract the game information related to the preferred team from among the five pieces of game information. As a result of the extraction of the game information related to the preferred team, the control unit 170 may acquire three pieces of game information as the game information related to the preferred team. The control unit 170 may perform a channel switching to a channel corresponding to any one of the three games based on the three game information.

In this case, the control unit 170 may control the display unit 180 to further display the game information together with the channel switching.

According to an embodiment, as illustrated in FIG. 16, the control unit 170 may control the display unit 180 to display the first to third game information 961, 962, and 963 that are the game information related to the preferred team in front of the fourth and fifth game information 964 and 965 that are the game information unrelated to the preferred team.

According to another embodiment, the control unit 170 may control the display unit 180 to display the first to third game information 961, 962, and 963 that are the game information related to the preferred team, which is greater than each of the fourth and fifth game information 964 and 965 that are the game information unrelated to the preferred team.

According to further another embodiment, the control unit 170 may control the display unit 180 to display the first to third game information 961, 962, and 963 that are the game information related to the preferred team so as to be distinguished from the fourth and fifth game information 964 and 965 that are the game information unrelated to the preferred team. For example, the display unit 180 may be controlled to display an indicator (not shown) only on the first to third game information 961, 962, and 963, which are the game information related to the preferred team and display the indicator on the fourth and fifth game information 964 and 965.

As described above, when receiving the display command for the information related to the sports, the control unit 170 may not simply display the information related to the sports, but first displays the information related to the preferred team preset by the user so that the information desired by the user is displayed more quickly and accurately.

On the other hand, when receiving the display command for the information related to the sports category in a state in which the preferred team is not set, the control unit 170 may control the display unit 180 to display the information related to the sports category in the order of channel numbers.

In addition, the control unit 170 may receive the display command for the information related to the preferred team.

Figure 17:
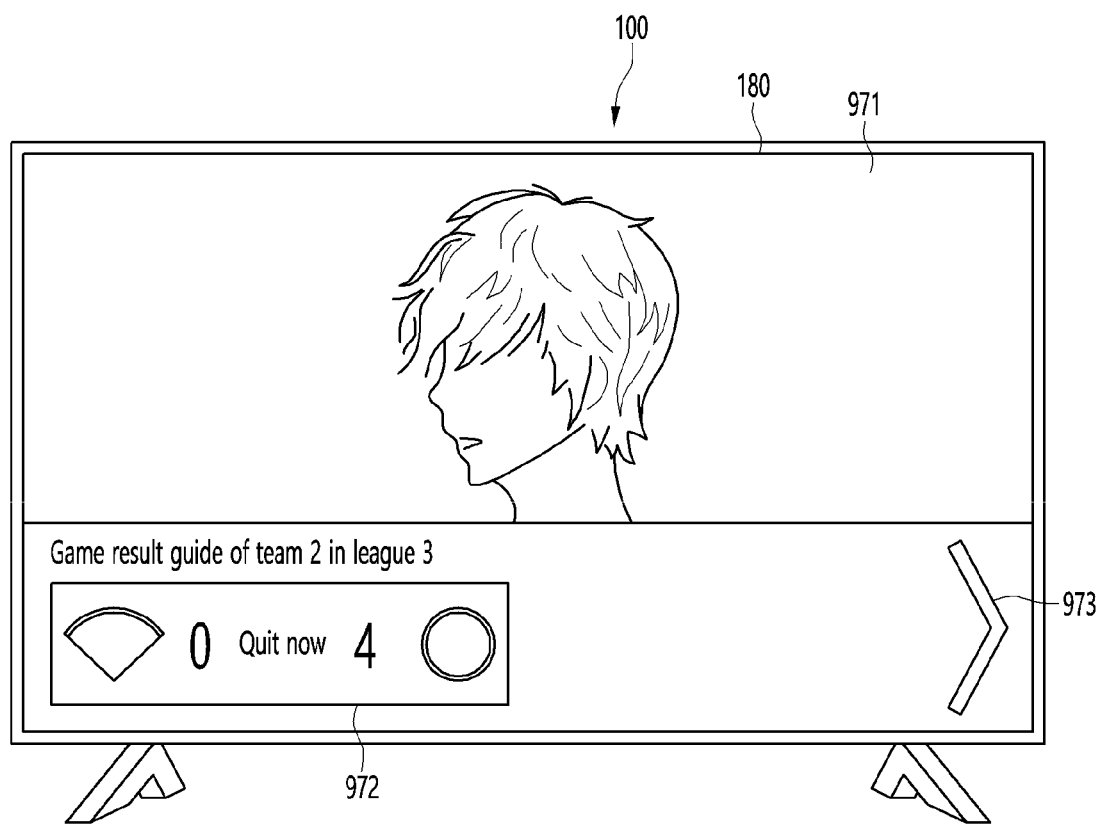
FIG. 17 is an exemplary view illustrating a method for receiving a display command for the information related to the preferred team by the display device according to an embodiment of the present disclosure.
Figure 17:

FIG. 17 is an exemplary view illustrating a method for receiving a display command for the information related to the preferred team by the display device according to an embodiment of the present disclosure.

As illustrated in FIG. 17, the control unit 170 may receive a display command for the information related to the preferred team, such as 'tell me the results of my team'. In this case, the control unit 170 may search for information related to a preset preferred team and display the search result.

If there are a plurality of preset preferred teams, the control unit 170 may control the display unit 180 to display a next icon 973 together with information 972 related to the first preferred team among the plurality of preferred teams. In addition, when receiving a selection command of the next icon 973, the control unit 170 may display information related to the second preferred team instead of the information 972 related to the first preferred team. That is, the control unit 170 may control the display unit 180 to sequentially display information related to the plurality of preferred teams.

According to another embodiment, the control unit 170 may control the display unit 180 to simultaneously display the information related to the plurality of preferred teams.

As described above, the control unit 170 may provide only the information related to the preset preferred team, and in this case, there is an advantage that the user easily receives only desired information.

In the examples of FIGS. 6 to 17, a case in which the display device 100 sets the preferred team for the sports category has been described, but this is only given as an example for convenience of description.

As another example, the display device 100 may preset a preferred person or a preferred genre for a drama category or a movie category.

That is, it is reasonable that the type of category, in which the preferred item is set, and the type of the preferred item are not limited.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

The invention claimed is:

1. A display device comprising:
a display unit; and
a control unit configured to:
set preferred teams for a sports category,
preferentially display the preferred teams in response to displaying information related to the sports category by receiving a display command for the information related to the sports category,
in response to selection of preferred team icons for the preferred teams, display an alarm setting pop-up, and individually set, by the alarm setting pop-up, each of the following alarms for the preferred teams: a broadcast schedule alarm, a real-time score alarm and a game result alarm.

2. The display device according to claim 1, wherein, in response to receiving a display command for information related to the sports category, the control unit controls the display unit to display information related to the preferred teams in front of information related to a team that is not set as the preferred teams.

3. The display device according to claim 1, wherein, in response to receiving a display command for information related to the sports category, the control unit controls the display unit to display information related to the preferred teams, which is larger than information related to a team that is not set as the preferred teams.

4. The display device according to claim 3, wherein, in response to receiving the display command for information related to the sports category, the control unit controls the display unit to display the information related to the preferred teams, which is distinguished from the information related to the team that is not set as the preferred teams.

5. The display device according to claim 3, wherein, in response to receiving the display command for information related to the sports category in a state in which the preferred teams is not set, the control unit controls the display unit to display the information related to the sports category in an order of channel numbers.

6. The display device according to claim 1, wherein, in response to a broadcast related to the preferred teams being scheduled, the control unit controls the display unit to display the broadcast schedule alarm before starting the broadcast related to the preferred teams.

7. The display device according to claim 6, wherein the display unit overlappingly displays the alarm on a current image.

8. The display device according to claim 1, wherein, in response to a change of the information related to the preferred teams occurs, the control unit controls the display unit to display changed information related to the preferred teams.

9. The display device according to claim 1, wherein, in response to a game score of the preferred teams is changed, or a game of the preferred teams is ended, the control unit recognizes this as a change of the information related to the preferred teams occurs.

10. The display device according to claim 1, wherein the control unit receives a setting command for the preferred teams for each sports category among a plurality of sports categories.

11. The display device according to claim 1, wherein, in response to receiving a plurality of different setting commands for one sports category a plurality of times, the control unit sets all of a plurality of teams as the preferred teams.

12. The display device according to claim 1, wherein, in response to the receiving a channel change command related to the sports category, the control unit changes the channel into a channel related to the preferred teams among channels related to the sports category.

13. The display device of claim 1, wherein in response to setting an output time point for the broadcast schedule alarm and the display unit displaying a broadcast unrelated to the preferred teams, the controls the display unit to display the broadcast alarm on an image providing an option to change the broadcast to the preferred teams.

14. The display device of claim 1, wherein in response to the real-time score alarm being set, the control unit controls the display unit to display the real-time score alarm when the preferred teams is being broadcast.

15. The display device of claim 1, wherein in response to the game result alarm being set, the control unit controls the display unit to display the game result alarm of the preferred teams.

16. The display device of claim 1, wherein the controller controls the display unit to display the broadcast alarm on an image providing an option to change the broadcast to the preferred teams, in response to setting an output time point for the broadcast schedule alarm and the display unit displaying a broadcast unrelated to the preferred teams.

17. The display device of claim 16, wherein in response to the real-time score alarm being set, the control unit is further configured to display the real-time score alarm when the preferred teams is being broadcast.

18. The display device of claim 16, wherein in response to the game result alarm being set, the control unit is further configured to display the game result alarm of the preferred teams.

\* \* \* \* \*